United States Patent
Kim et al.

(10) Patent No.: US 10,633,488 B2
(45) Date of Patent: Apr. 28, 2020

(54) ORGANIC ZINC CATALYST, PREPARATION METHOD THEREOF, AND METHOD FOR PREPARING POLYALKYLENE CARBONATE RESIN USING THE CATALYST

(71) Applicant: LG CHEM, LTD., Seoul (KR)

(72) Inventors: Sung-Kyoung Kim, Daejeon (KR); Seung Young Park, Daejeon (KR)

(73) Assignee: LG CHEM LTD., Seoul (KR)

( * ) Notice: Subject to any disclaimer, the term of this patent is extended or adjusted under 35 U.S.C. 154(b) by 31 days.

(21) Appl. No.: 15/761,323

(22) PCT Filed: Mar. 8, 2017

(86) PCT No.: PCT/KR2017/002522
§ 371 (c)(1),
(2) Date: Mar. 19, 2018

(87) PCT Pub. No.: WO2017/155307
PCT Pub. Date: Sep. 14, 2017

(65) Prior Publication Data
US 2018/0265632 A1    Sep. 20, 2018

(30) Foreign Application Priority Data

Mar. 9, 2016  (KR) .................. 10-2016-0028458

(51) Int. Cl.
| | |
|---|---|
| C08G 64/34 | (2006.01) |
| B01J 37/04 | (2006.01) |
| B01J 31/06 | (2006.01) |
| B01J 31/02 | (2006.01) |
| B01J 31/04 | (2006.01) |
| B01J 23/06 | (2006.01) |
| B01J 27/20 | (2006.01) |

(52) U.S. Cl.
CPC .............. *C08G 64/34* (2013.01); *B01J 23/06* (2013.01); *B01J 27/20* (2013.01); *B01J 31/0204* (2013.01); *B01J 31/04* (2013.01); *B01J 31/068* (2013.01); *B01J 37/04* (2013.01)

(58) Field of Classification Search
CPC .......... C08G 65/12; C08G 64/34; B01J 37/04; B01J 31/0204; B01J 31/068; B01J 31/04; B01J 27/20; B01J 23/06
See application file for complete search history.

(56) References Cited

U.S. PATENT DOCUMENTS

| | | | |
|---|---|---|---|
| 4,981,948 A | 1/1991 | Kawachi et al. | |
| 7,148,317 B2 | 12/2006 | Moon et al. | |
| 7,405,265 B2 | 7/2008 | Moon et al. | |
| 8,779,087 B2 | 7/2014 | Fujimoto et al. | |
| 9,447,236 B2 | 9/2016 | Kim et al. | |
| 9,458,285 B2 | 10/2016 | Kim et al. | |
| 2005/0163971 A1* | 7/2005 | Kobayashi | G02B 1/04 428/156 |
| 2009/0216033 A1 | 8/2009 | Lekhac | |
| 2009/0240025 A1 | 9/2009 | Fujimoto et al. | |
| 2014/0200328 A1 | 7/2014 | Brym et al. | |
| 2015/0361023 A1 | 12/2015 | Kim et al. | |
| 2016/0272760 A1 | 9/2016 | Kim et al. | |
| 2016/0289379 A1 | 10/2016 | Kim et al. | |
| 2017/0029563 A1* | 2/2017 | Kang | C08G 64/20 |

FOREIGN PATENT DOCUMENTS

| | | |
|---|---|---|
| EP | 2711385 A1 | 3/2014 |
| JP | 02-47134 A | 2/1990 |
| JP | 2006002063 A | 1/2006 |
| JP | 2006257374 A | 9/2006 |
| JP | 2007126547 A | 5/2007 |
| JP | 5697595 B2 | 4/2015 |
| KR | 10-0722380 B1 | 5/2007 |
| KR | 10-2009-0025219 A | 3/2009 |
| KR | 10-2010-0127766 A | 12/2010 |
| KR | 10-2014-0062130 A | 5/2014 |
| KR | 10-1494833 B1 | 2/2015 |
| KR | 10-1497042 B1 | 3/2015 |
| KR | 10-2015-0058044 A | 5/2015 |
| KR | 10-2015-0058046 A | 5/2015 |
| KR | 10-2015-0143342 A | 12/2015 |
| WO | 2013/034489 A1 | 3/2013 |
| WO | 2015190874 A1 | 12/2015 |

OTHER PUBLICATIONS

Fuch, et al.; "A new air-stable zinc complex based on a 1,2-phenylene-diimino-2-cynoacrylate ligand as an efficient catalyst of the epoxide-$CO_2$ coupling".; The Royal Society of Chemistry; Dalton Trans, vol. 43, pp. 2344-2347; 2014.

* cited by examiner

*Primary Examiner* — Shane Fang
(74) *Attorney, Agent, or Firm* — Dentons US LLP

(57) ABSTRACT

The present invention relates to an organic zinc catalyst which exhibits more improved catalytic activity than conventional organic zinc catalysts during a polymerization process for the preparation of a polyalkylene carbonate resin and is capable of preventing an aggregation phenomenon during a reaction, a method for preparing the same, and a method for preparing a polyalkylene carbonate resin using the organic zinc catalyst.

The method for preparing an organic zinc catalyst includes the step of reacting a zinc precursor with a dicarboxylic acid in the presence of a polyether derivative to form a zinc dicarboxylate-based catalyst.

9 Claims, No Drawings

ORGANIC ZINC CATALYST, PREPARATION METHOD THEREOF, AND METHOD FOR PREPARING POLYALKYLENE CARBONATE RESIN USING THE CATALYST

TECHNICAL FIELD

This application is a National Stage Entry of International Application No. PCT/KR2017/002522, filed on Mar. 8, 2017, and claims the benefit of and priority to Korean Application No. 10-2016-0028458, filed on Mar. 9, 2016, all of which are hereby incorporated by reference in their entirety for all purposes as if fully set forth herein.

The present invention relates to an organic zinc catalyst which exhibits more improved activity during a polymerization process for the preparation of a polyalkylene carbonate resin, to a preparation method thereof, and to a method for preparing a polyalkylene carbonate resin using the organic zinc catalyst.

BACKGROUND OF ART

Since the industrial revolution, modern society has been built by consuming a large amount of fossil fuels, however, carbon dioxide concentration in the atmosphere has increased, and further, this increase has been more accelerated by environmental destruction such as deforestation, etc. Global warming is caused by an increase of greenhouse gases such as carbon dioxide, Freon, and methane in the atmosphere, such that it is particular important to reduce the atmospheric concentration of carbon dioxide highly contributing to global warming, and various studies into emission regulation, immobilization, etc., have been conducted on a global scale.

Among the studies, copolymerization of carbon dioxide and epoxide developed by Inoue, et al., is expected as a reaction for solving the problems of global warming, and has been actively researched in view of chemical immobilization of carbon dioxide and in view of the use of carbon dioxide as a carbon resource. Particularly, a polyalkylene carbonate resin obtained by the polymerization of carbon dioxide and epoxide has recently received particular attention as a kind of biodegradable resin.

Various catalysts for preparing the polyalkylene carbonate resin have been studied and suggested for a long time, and as representative examples thereof, zinc dicarboxylate-based catalysts such as a zinc glutarate catalyst, etc., in which zinc and dicarboxylic acid are bonded to each other have been known.

The zinc dicarboxylate-based catalyst, and as a representative example, a zinc glutarate catalyst, is formed by reacting a zinc precursor with a dicarboxylic acid such as a glutaric acid, etc., and has a shape of fine crystalline particles. However, the zinc dicarboxylate-based catalyst having the crystalline particle shape has a difficulty in being controlled to have a uniform and fine particle size in a preparation process thereof. The existing zinc dicarboxylate-based catalyst has a particle size of a nanometer scale, but an aggregate having an increased particle size and a decreased surface area is formed in a medium by aggregation of catalyst particles such that at the time of preparing the polyalkylene carbonate resin, the activity may be deteriorated.

In this regard, it has been found that as the zinc precursor used in the preparation of the zinc dicarboxylate-based catalyst has a smaller size, it has an important influence on the activity increase of the produced catalyst.

Generally, zinc oxide powder used as a zinc source (zinc precursor) in the preparation of the zinc dicarboxylate-based catalyst is an ionically bonded substance having a particle size of several tens to several hundred nanometers and a specific surface area of about 10 $m^2/g$. This zinc oxide powder is highly polar, and thus is dispersed well in polar solvents, but particles are aggregated with each other in non-polar solvents to form very large aggregates. When a catalytic synthetic reaction is carried out under the aggregation of particles, a heterogeneous reaction occurs, and therefore heterogeneity in crystallinity of the resulting catalyst is increased, thus decreasing the activity of the catalyst, in view of the entire reaction system.

In this regard, International Publication WO 2013/034489 and U.S. Pat. No. 7,405,265 disclose a method for increasing a specific surface area of a zinc dicarboxylate-based catalyst by using an emulsifier or a non-ionic surfactant as a templating agent in a polar solution. However, the results of the previous literatures or studies showed that when zinc oxide and glutaric acid are used as raw materials for the synthesis of zinc dicarboxylate-based catalyst, a catalyst synthesized in a non-polar solvent generally has higher activity than a catalyst synthesized in a polar solvent. Thus, there is still a limitation in the improvement of the catalytic activity by the method of using the polar solvent.

In addition, the activity of the existing zinc dicarboxylate-based catalyst itself is not satisfactory. Moreover, in the case of the zinc dicarboxylate-based catalyst, it is not easy to disperse and control the catalyst particles in a reaction solution due to the non-uniformity of the particle diameter.

DETAILED DESCRIPTION OF THE INVENTION

Technical Problem

It is an object of the present invention to provide an organic zinc catalyst which exhibits more improved catalytic activity than conventional organic zinc catalysts during a polymerization process for the preparation of a polyalkylene carbonate resin, and is particularly capable of preventing an aggregation phenomenon in the process of preparing a catalyst, and a method for preparing the same.

It is an object of the present invention to provide a method for preparing a polyalkylene carbonate resin using the organic zinc catalyst obtained through the above preparation method.

Technical Solution

According to the present invention, a method for preparing an organic zinc catalyst is provided, the method including a step of reacting a zinc precursor with a dicarboxylic acid having 3 to 20 carbon atoms in the presence of an aliphatic or aromatic polyether derivative having a functional group at a terminus thereof to form a zinc dicarboxylic acid-based catalyst.

According to the present invention, an organic zinc catalyst which is the zinc dicarboxylate-based catalyst obtained by the above method is also provided, wherein the organic zinc catalyst includes a polyether physically or chemically bonded to the catalyst in an amount of 0.001 to 5% by weight based on the weight of the catalyst.

Further, according to the present invention, a method for preparing a polyalkylene carbonate resin is provided, the method including polymerizing monomers including an epoxide and carbon dioxide in the presence of an organic zinc catalyst prepared by the above method.

Advantageous Effects

According to the present invention, a method for preparing an organic zinc catalyst which exhibits excellent catalytic activity during a preparation of a polyalkylene carbonate resin, and particularly is capable of preventing reduction in catalyst aggregation which can cause a decrease in activity in the process of preparing a polyalkylene carbonate resin, is provided.

DETAILED DESCRIPTION OF THE EMBODIMENTS

The present invention will now be described in more detail. It should be understood that the terms used in the specification and the appended claims should not be construed as limited to general and dictionary meanings, but are to be interpreted based on the meanings and concepts corresponding to technical aspects of the present disclosure on the basis of the principle that the inventor is allowed to define terms appropriately for the best explanation.

In the present specification, the terms "including" and "comprising" are used to specify specific features, areas, integers, steps, operations, elements, and/or components, and do not preclude the presence or addition of specific features, areas, integers, steps, operations, elements, and/or components.

Hereinafter, a method for preparing an organic zinc catalyst according to embodiments of the present invention, an organic zinc catalyst obtained by the method, and a method for preparing a polyalkylene carbonate resin using the same will be described in more detail.

I. Preparation Method of Organic Zinc Catalyst

According to the present invention, a method for preparing an organic zinc catalyst is provided, the method including a step of reacting a zinc precursor with a dicarboxylic acid having 3 to 20 carbon atoms in the presence of an aliphatic or aromatic polyether derivative having a functional group at a terminus thereof to form a zinc dicarboxylic acid-based catalyst.

The present invention relates to a method for developing a heterogeneous organic metal catalyst used for the preparation of polyalkylene carbonates through copolymerization of carbon dioxide and an epoxide compound.

During the synthesis of the existing zinc dicarboxylic acid catalyst, the zinc compound and the dicarboxylic acid were reacted in a single solvent, and the zinc dicarboxylic acid catalyst was synthesized without special additives other than the monocarboxylic acid such as acetic acid. Most of the zinc dicarboxylic acid catalyst thus synthesized showed restricted catalytic activity. For example, zinc glutarate is synthesized by stirring ZnO and glutaric acid in a reaction solvent such as toluene at a constant temperature for a certain period of time. At this time, a small amount of acetic acid which is a monocarboxylic acid was also added.

However, the above-mentioned method has limitations in improving the catalytic activity, and thus a method of adding a polyether derivative in a specific manner at the time of synthesis of an organic zinc catalyst is provided.

For this purpose, the present inventors found that when polyether is added at the time of synthesis of a zinc glutarate catalyst, the activity is increased as compared with a general zinc glutarate catalyst. However, in the zinc glutarate catalyst prepared by adding polyether, an aggregation phenomenon can occur due to interaction of polyethers present on the surface of the catalyst, which can cause a decrease in activity.

Accordingly, the present inventers has focused on such a method, and developed a method using a polyether having a functional group at a terminus thereof. Therefore, the present invention seeks to identify additional functions by terminal functional groups of the polyether.

Such a method of the present invention can prevent an aggregation phenomenon by introducing an alkyl chain or the like having an appropriate length to the terminus of a polyether such as polyethylene glycol. In addition, the present invention can provide various functions to the catalyst by introducing various functional groups.

Therefore, it has been found that when a specific polyether derivative of the present invention is used in the reaction between the zinc precursor and the dicarboxylic acid for the preparation of the organic zinc catalyst, an organic zinc catalyst having more improved polymerization activity than the conventional organic zinc catalysts can be obtained. In addition, the method of the present invention can produce an organic zinc metal catalyst having excellent catalytic activity without a monocarboxylic acid such as acetic acid as well as other special additives as in the conventional method.

The polyether derivative used in the present invention is composed of one or more ethylene oxide groups and terminal functional groups, wherein the terminal functional groups prevent an aggregation phenomenon during the reaction. Therefore, according to the present invention, it is possible to produce an organic zinc catalyst having a high catalyst production yield and high catalytic activity, as compared with a catalyst not having a polyether derivative.

The polyether derivative used herein may refer to an aliphatic or aromatic polyether derivative having a functional group at a terminus thereof, in which the terminus of the polyether, which is a polymer having one kind of repeating unit having an ether bond as a main chain, is substituted with an alkyl group having 1 to 18 carbon atoms, an aryl group having 6 to 18 carbon atoms, a vinyl group, an alkyl acrylate, a phosphate, or a sulfonyl group.

That is, as the polyether derivative, an aliphatic polyether and an aromatic polyether can be used without particular limitation, and may be selected depending on the characteristics of the reactants and reaction medium in the synthesis reaction of the zinc dicarboxylate-based catalyst. In particular, an aliphatic polyether derivative is preferred, from the viewpoint of securing the effect of modification due to polyether without impairing the reactivity between the zinc precursor and the dicarboxylic acid.

Such polyether derivatives that can be used herein include one or more compounds selected from the group consisting of tetraethylene glycol dimethyl ether, diethylene glycol dibutyl ether, tetraethylene glycol dimethacrylate, benzyl-PEG (polyethylene glycol), PEG-aldehyde, PEG-phosphate, and PEG-phospholipid.

As an example of the polyether derivative, a polyethylene glycol derivative used in catalyst synthesis is composed of at least one ethylene oxide group and terminal functional group. Representative examples thereof are shown in Table 1 below.

TABLE 1

| | Chemical Structure |
|---|---|
| Tetraethylene glycol dimethyl ether |  |
| Diethylene glycol dibutyl ether | 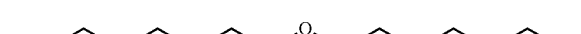 |
| Tetraethylene dimethacrylate | 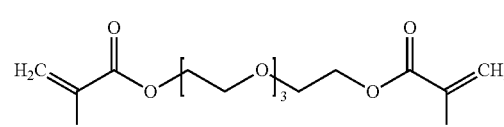 |
| Benzyl-PEG |  |

The polyether derivative may have a weight average molecular weight (Mw) of 100 to 10,000, 100 to 7500, or 200 to 5000. That is, in order to sufficiently express the effect of modification due to the polyether derivative, it is desirable that the polyether derivative has a weight average molecular weight of 100 or more, more preferably 200 or more. However, if the molecular weight of the polyether derivative is too large, it may affect the composition of the reaction medium, and thereby the reactivity of the reactants may be lowered or the crystallinity of the catalyst may be lowered. Therefore, it is more desirable that the polyether has a weight average molecular weight of 5000 or less.

Therefore, the organic zinc catalyst prepared by the above method can have a physically or chemically bonded polyether derivative. For example, the organic zinc catalyst may have moieties or coordinated structures of polyether derivatives bonded to the surface thereof, and may have a polyether derivative physically adsorbed into the structure of the organic zinc catalyst. Further, the catalyst may also be a porous coordination polymer catalyst.

Specific polyether derivatives physically or chemically bonded to the organic zinc catalyst can provide a favorable environment for the ring opening of the epoxide in the preparation of the polyalkylene carbonate resin using the organic zinc catalyst, and also provide a favorable environment for the adsorption of the adsorbent.

Meanwhile, according to an embodiment of the invention, the step of forming the zinc dicarboxylic acid-based catalyst is carried out by reacting a zinc precursor with a dicarboxylic acid having 3 to 20 carbon atoms in the presence of an aliphatic or aromatic polyether having a functional group at the terminus thereof.

As the zinc precursor, any zinc precursor used for the preparation of a zinc dicarboxylic acid-based catalyst can be used without particular limitation. Specifically, the zinc precursor may be at least one zinc compound selected from the group consisting of zinc oxide (ZnO), zinc sulfate ($ZnSO_4$), zinc chlorate ($Zn(ClO_3)_2$), zinc nitrate ($Zn(NO_3)$), and zinc hydroxide ($Zn(OH)_2$).

As the dicarboxylic acid, an arbitrary dicarboxylic acid having 3 to 20 carbon atoms may be used. Specifically, the dicarboxylic acid may be an aliphatic dicarboxylic acid such as malonic acid, glutaric acid, succinic acid, and adipic acid, or aromatic dicarboxylic acids such as terephthalic acid, isophthalic acid, homophthalic acid, and phenylglutaric acid. In addition, various aliphatic or aromatic dicarboxylic acids having 3 to 20 carbon atoms may be used. In particular, in terms of the activity of the catalyst, the dicarboxylic acid may preferably be glutaric acid. In this case, the organic zinc catalyst is a zinc glutarate-based catalyst.

According to an embodiment of the present invention, the dicarboxylic acid may be used in the molar amount equivalent to or excessively higher than the amount of the zinc precursor, and specifically, the dicarboxylic acid may be used in an amount of about 1 to 1.5 mol, or about 1.1 to 1.3 mol, based on 1 mol of the zinc precursor. When the reaction is performed using dicarboxylic acid in an amount equivalent to or excessively higher than the amount of the zinc precursor, the reaction may occur slowly while the uniformly dispersed zinc precursors are surrounded by dicarboxylic acid molecules or ions. Therefore, zinc precursors may react with dicarboxylic acids while zinc precursors hardly aggregate with each other, and therefore, an organic zinc catalyst having a more uniform or fine particle size and exhibiting improved activity can be obtained.

In particular, according to an embodiment of the invention, the reaction between the zinc precursor and the dicarboxylic acid is carried out in the presence of the polyether derivatives described above.

The polyether derivative can be present in the reaction system in an amount of 0.1 to 10% by weight, 1 to 10% by weight, 1 to 7.5% by weight, or 1 to 5% by weight based on the zinc precursor. That is, in order to sufficiently carry out modification with the polyether derivative, it is desirable that the polyether derivative is present in the reaction system in an amount of 0.1% by weight or more based on the zinc precursor. However, when the polyether derivative is mixed in an excess amount, the polyether derivative participates in the reaction to induce a side reaction, or may affect the composition of the medium, thereby deteriorating the crystallinity of the catalyst. Consequently, aggregation of catalyst particles can be induced. Therefore, it is desirable that the polyether derivative is present in the reaction system in an amount of 10% by weight or less based on the zinc precursor. When the polyether derivative is used in a small amount of less than 0.1% by weight, there is a problem that the aggregation phenomenon cannot be prevented in the reaction for preparing the catalyst.

Meanwhile, the reaction step may be carried out under a liquid medium in which reactants containing a zinc precursor, a dicarboxylic acid, and a polyether derivative are present (for example, the reaction is carried out in a state of solution in which the reactants and the polyether derivative are dissolved or dispersed). At this time, the reaction can be carried out while adding the solution or dispersion containing the zinc precursor in portions two times or more to a solution containing the dicarboxylic acid. That is, some of the solution containing the zinc precursor is added to the solution containing the dicarboxylic acid to perform the reaction, and then the rest of the reaction is performed while adding the rest of the solution containing the zinc precursor in portions. Therefore, the entire reaction step may be performed while maintaining the molar ratio between the zinc precursor and the dicarboxylic acid in the reaction system, and the organic zinc catalyst having a more uniform and fine particle size and exhibiting improved activity may be obtained. Further, the entire reaction step may be performed while uniformly dripping the solution containing the zinc precursor in a droplet form into the solution containing the dicarboxylic acid.

As the liquid medium, any organic or aqueous solvent in which it is known that the zinc precursor and/or dicarboxylic acid can easily form catalyst particles may be used. Specifically, the liquid medium may be one or more solvents selected from the group consisting of toluene, hexane, dimethylformamide, ethanol, and water.

The reaction between the zinc precursor and the dicarboxylic acid can be carried out at a temperature of about 50 to 130° C. for about 1 to 10 hours. As described above, the zinc precursor can be divided and added at equal intervals in the entire reaction time, so that the molar ratio of reactants in the reaction system can be maintained over the entire reaction step.

If necessary, a washing step and a drying step of the synthesized organic zinc catalyst may be carried out.

II. Organic Zinc Catalyst

According to another embodiment of the present invention, as the zinc dicarboxylic acid-based catalyst obtained by reacting a zinc precursor with a dicarboxylic acid having 3 to 20 carbon atoms in the presence of an aliphatic or aromatic polyether having a functional group at a terminus thereof, an organic zinc catalyst containing a polyether derivative physically or chemically bonded to the catalyst in an amount of 0.001 to 5% by weight based on the weight of the catalyst.

The organic zinc catalyst is obtained by reacting a zinc precursor and a dicarboxylic acid in the presence of the polyether derivative, and preferably, the organic zinc catalyst can be obtained by the above-mentioned preparation method.

The organic zinc catalyst prepared by the above method may have a physically or chemically bonded polyether derivative. For example, the organic zinc catalyst may be moieties or coordinated structures of polyether derivatives having a specific terminal group bonded to their surface, and it can be a structure that is physically adsorbed in the structure of the organic zinc catalyst.

Thus, the polyether derivative physically or chemically bonded to the organic zinc catalyst can provide a favorable environment for the ring opening of epoxide in the preparation of the polyalkylene carbonate resin using the organic zinc catalyst, and also provide a favorable environment for the adsorption of carbon dioxide. Consequently, the organic zinc catalyst can exhibit improved polymerization activity during production of the polyalkylene carbonate resin, as compared to a conventional catalyst not having a polyether or polyether derivative. Further, in the present invention, it is possible to produce a catalyst having excellent activity without separately adding a monocarboxylic acid such as acetic acid.

The polyether derivative may be present on the organic zinc catalyst in an amount of 5% by weight or less, 0.001 to 5% by weight, 0.001 to 3% by weight, or 0.01 to 1.5% by weight, based on the weight of the catalyst. When the polyether derivative is excessively present on the catalyst, the active surface of the catalyst can be blocked and the activity of the catalyst may be lowered. In addition, when the polyether derivative is excessively present on the catalyst, aggregation of the catalyst particles can be induced, thereby reducing the active site of the catalytic reaction. Therefore, the content of the polyether derivative present on the catalyst is preferably 5% by weight or less based on the weight of the catalyst.

Thus, when the organic zinc catalyst is used for the preparation of the polyalkylene carbonate resin by the copolymerization of carbon dioxide and epoxide, an increased contact area between the catalyst particles and the reactant can be ensured and an improved activity can be expected.

III. Method for Preparing Polyalkylene Carbonate Resin Using the Catalyst

According to another embodiment of the invention, a process for preparing a polyalkylene carbonate resin including the step of polymerizing monomers containing an epoxide and carbon dioxide in the presence of an organic zinc catalyst prepared by the above-mentioned method is provided.

In the method for preparing such resin, the organic zinc catalyst can be used in the form of a heterogeneous catalyst, and the polymerization step can be carried out by solution polymerization in an organic solvent. Thereby, the heat of reaction can be appropriately controlled, and the molecular weight and the viscosity of the polyalkylene carbonate resin to be obtained can be easily controlled.

In such a solution polymerization, as the solvent, one or more selected from the group consisting of methylene chloride, ethylene dichloride, trichloroethane, tetrachloroethane, chloroform, acetonitrile, propionitrile, dimethylformamide, N-methyl-2-pyrrolidone, dimethyl sulfoxide, nitromethane, 1,4-dioxane, hexane, toluene, tetrahydrofuran, methylethylketone, methylamino ketone, methyl isobutyl ketone, acetone, cyclohexanone, trichloroethylene, methyl acetate, vinyl acetate, ethyl acetate, propyl acetate, butyrolactone, caprolactone, nitropropane, benzene, styrene, xylene, and methyl propasol may be used. Among them, when methylene chloride or ethylene dichloride is used as the solvent, a polymerization reaction may be more effectively performed.

The solvent may be used in a weight ratio of about 1:0.5 to 1:100, and preferably about 1:1 to 1:10, based on the epoxide. In this case, if the ratio is excessively low, at less than about 1:0.5, the solvent does not suitably serve as a reaction medium, such that it may be difficult to achieve advantages of the solution polymerization as described above. Further, if the ratio is more than about 1:100, a concentration of the epoxide or the like is relatively decreased, such that productivity may be deteriorated, a molecular weight of a finally formed resin may be decreased, or side reactions may be increased.

In addition, the organic zinc catalyst may be added in a molar ratio of about 1:50 to 1:1000, based on the epoxide. More preferably, the organic zinc catalyst may be added in a molar ratio of about 1:70 to 1:600, or 1:80 to 1:300, based on the epoxide. If the ratio is excessively small, it is difficult to obtain sufficient catalytic activity at the time of solution polymerization. On the contrary, if the ratio is excessively large, an excessive amount of catalyst is used, which is not efficient, and by-products may be formed, or back-biting of the resin may occur due to heating in the presence of the catalyst.

Meanwhile, as the epoxide, one or more selected from the group consisting of alkylene oxides having 2 to 20 carbon atoms, which are substituted or unsubstituted with a halogen or an alkyl group having 1 to 5 carbon atoms; cycloalkylene oxides having 4 to 20 carbon atoms, which are substituted or unsubstituted with a halogen or an alkyl group having 1 to 5 carbon atoms; and styrene oxides having 8 to 20 carbon atoms, which are substituted or unsubstituted with a halogen or an alkyl group having 1 to 5 carbon atoms, may be used. As a representative epoxide, alkylene oxide having 2 to 20 carbon atoms, which is substituted or unsubstituted with a halogen or an alkyl group having 1 to 5 carbon atoms, may be used.

Specific examples of the epoxide may include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-octene, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxynorbornene, limonene oxide, dieldrin, 2,3-epoxypropylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxypropyl ether, epoxypropyl methoxyphenyl ether, biphenyl glycidyl ether, glycidyl naphthyl ether, and the like. As the most representative epoxide, ethylene oxide is used.

In addition, the above-mentioned solution polymerization may be carried out at about 50 to 100° C. and at about 15 to 50 bar for about 1 to 60 hours. Further, the solution polymerization may be more suitably carried out at about 70 to 90° C. and at about 20 to 40 bar for about 3 to 40 hours.

Meanwhile, since other polymerization processes and conditions except for the above-mentioned contents may depend on general polymerization conditions for preparing a polyalkylene carbonate resin, a detailed description thereof will be omitted.

Hereinafter, preferred examples are provided for better understanding. However, these examples are for illustrative purposes only, and the invention is not intended to be limited by these examples.

COMPARATIVE EXAMPLE 1

A ZnGA catalyst was prepared by a conventional method of adding acetic acid without PEG derivatives.

That is, in a 250 mL round bottom flask, 6.61 g (0.05 mol) of glutaric acid, 4.1 g (0.05 mol) of ZnO, and 0.1 mL of acetic acid were added to 150 mL of toluene, and dispersed under reflux. Then, the mixed solution was heated at a temperature of 55° C. for 3 hours, and at a temperature of 110° C. for 4 hours. A white solid was produced, filtered and washed with acetone/ethanol, and dried in a vacuum oven at 130° C.

EXAMPLE 1

A ZnGA catalyst was prepared under the condition that acetic acid was not added.

That is, in a 250 mL round bottom flask, 6.61 g (0.05 mol) of glutaric acid and 4.1 g (0.05 mol) of ZnO were added to 150 mL toluene to which tetraethylene glycol dimethyl ether (TEG DME, Mw 222.28) was added in an amount of 5 wt % based on the ZnO content, and dispersed under reflux. Then, the mixed solution was reacted while stirring at a temperature of 55° C. for 3 hours, and at a temperature of 110° C. for 4 hours. A white solid was produced, and then the reaction vessel was cooled to room temperature and the precipitate was separated by filtration. The separated precipitate was washed with acetone/ethanol three times or more. The washed precipitate was dried in a vacuum oven at 130° C. for 12 hours, and finally 9.5 g of zinc glutarate catalyst was obtained.

EXAMPLE 2

An organic zinc catalyst was prepared in the same manner as in Example 1, except that benzyl-PEG was added and used in an amount of 5 wt % based on the ZnO content instead of tetraethylene glycol dimethyl ether of Example 1.

COMPARATIVE EXAMPLE 2

An organic zinc catalyst was prepared in the same manner as in Example 1, except that ethylene glycol dimethyl ether was added and used in an amount of 15 wt % based on the ZnO content instead of tetraethylene glycol dimethyl ether of Example 1.

COMPARATIVE EXAMPLE 3

An organic zinc catalyst was prepared in the same manner as in Example 1, except that tetraethylene glycol dimethyl ether of Example 1 was and used in an amount of 0.05 wt % based on the ZnO content.

COMPARATIVE EXAMPLES 4 TO 6 AND EXAMPLES 3 TO 4>

(Preparation of Polyethylene Carbonate)

Polyethylene carbonate (PEC) was prepared by using the ZnGA catalysts of Comparative Examples 1 to 3 and Examples 1 and 2 in the following manner.

In a glove box, a zinc glutarate catalyst and methylene chloride (MC) were put into a high-pressure reactor and then ethylene oxide (EO) was added thereto. Carbon dioxide ($CO_2$) was then added to the reactor. The polymerization reaction was carried out at 70° C. for 3 hours. After completion of the reaction, unreacted carbon dioxide and ethylene oxide were removed together with the methylene chloride solvent. To determine the amount of PEC produced, the remaining solids were completely dried and then weighted. Activities and yields of the catalyst according to such polymerization process are shown in Table 2 below.

TABLE 2

| | Cat. (g) | | | | | EO (g) | MC (g) | CO$_2$ (g) | Activity (g/g-Cat.) | EO conversion ratio (%) | TOF (mol/mol-Cat.) |
|---|---|---|---|---|---|---|---|---|---|---|---|
| | Comparative Example | | | Example | | | | | | | |
| | 1 | 2 | 3 | 1 | 2 | | | | | | |
| Comparative Example 4 | 0.2 | | | | | 9.3 | 8.5 | 10.7 | 26 | 27 | 18.9 |
| Comparative Example 5 | | 0.2 | | | | 8.7 | 8.5 | 10.2 | 29 | 31 | 21.1 |
| Comparative Example 6 | | | 0.2 | | | 9.1 | 8.5 | 10.5 | 27 | 29 | 19.6 |
| Example 3 | | | | 0.2 | | 7.5 | 8.5 | 9.7 | 42 | 56 | 31.1 |
| Example 4 | | | | | 0.2 | 8.6 | 8.5 | 9.8 | 34 | 36 | 24.8 |

The results of Table 2 show that in Examples 3 to 4 of the present invention, even when using the organic zinc catalysts of Examples 1 and 2 in which acetic acid was not used, they exhibit greatly improved catalytic activity as compared with Comparative Examples 4 to 6. Therefore, in Examples 3 to 4 of the present invention, the production amount of the polyethylene carbonate resin can be effectively increased.

However, in Comparative Example 4, the catalyst of Comparative Example 1 using general acetic acid was used, and thus the catalyst activity was limited. In addition, in Comparative Example 2, the crystallinity of the catalyst was lowered due to the occurrence of a side reaction in which the polyether derivative was excessively used as compared with the zinc precursor. Further, in Comparative Example 3, too little of the polyether derivative was used as compared with the zinc precursor, and thus the problem of aggregation during catalyst production could not be solved. Therefore, Comparative Examples 5 and 6, in which polyethylene carbonate was produced by using the catalysts of Comparative Examples 2 and 3, exhibited relatively lower catalytic activity and produced many by-products.

While the present invention has been particularly shown and described with reference to specific embodiments thereof, it would be obvious to those skilled in the art that such specific description is merely to illustrate a preferred embodiment and the invention is not intended to be limited thereto. Therefore, the substantial scope of the invention may be defined by the appended claims and their equivalents.

The invention claimed is:

1. A method for preparing an organic zinc catalyst, the method comprising a step of reacting a zinc precursor with a dicarboxylic acid having 3 to 20 carbon atoms in the presence of an aliphatic or aromatic polyether derivative having a functional group at a terminus thereof to form a zinc dicarboxylic acid-based catalyst,
    wherein the polyether derivative includes an aliphatic or aromatic polyether derivative having a functional group at a terminus thereof which is substituted with an alkyl group having 1 to 18 carbon atoms, an aryl group having 6 to 18 carbon atoms, a vinyl group, an alkyl acrylate, a phosphate, or a sulfonyl group, and
    wherein the polyether derivative is at least one compound selected from the group consisting of tetraethylene glycol dimethyl ether, diethylene glycol dibutyl ether, tetraethylene glycol dimethacrylate, benzyl-PEG (polyethylene glycol), a PEG aldehyde, and a PEG-phospholipid.

2. The method for preparing an organic zinc catalyst according to claim 1, wherein the polyether derivative has a weight average molecular weight of 100 to 10,000.

3. The method for preparing an organic zinc catalyst according to claim 1, wherein the polyether derivative is present in an amount of 0.1 to 10% by weight based on the zinc precursor.

4. The method for preparing an organic zinc catalyst according to claim 1, wherein the zinc precursor is at least one zinc compound selected from the group consisting of zinc oxide (ZnO), zinc sulfate (ZnSO$_4$), zinc chlorate (Zn(ClO$_3$)$_2$), zinc nitrate (Zn(NO$_3$)), and zinc hydroxide (Zn(OH)$_2$).

5. The method for preparing an organic zinc catalyst according to claim 1, wherein the dicarboxylic acid is at least one selected from the group consisting of malonic acid, glutaric acid, succinic acid, adipic acid, terephthalic acid, isophthalic acid, homophthalic acid, and phenylglutaric acid.

6. The method for preparing an organic zinc catalyst according to claim 1, wherein the reaction between the zinc precursor and the dicarhoxylic acid is present in an amount of about 1 to 1.5 mol based on 1 mol of the zinc precursor.

7. The method for preparing an organic zinc catalyst according to claim 1, wherein the reaction between the zinc precursor and the dicarhoxylic acid is carried out under at least one liquid medium selected from the group consisting of toluene, hexane, dimethylformamide, ethanol, and water.

8. The method for preparing an organic zinc catalyst according to claim 1, wherein the reaction between the zinc precursor and the dicarboxylic acid is carried out at a temperature of 50 to 1300° C. for 1 to 10 hours.

9. The method for preparing an organic zinc catalyst according to claim 1, wherein the reaction between the zinc precursor and the dicarboxylic acid is carried out without addition of monocarboxylic acid.

* * * * *